US009480239B2

(12) United States Patent
Worsley et al.

(10) Patent No.: US 9,480,239 B2
(45) Date of Patent: Nov. 1, 2016

(54) ANIMAL FEEDER

(71) Applicant: Redneck Outdoor Products, LLC, Lamar, MO (US)

(72) Inventors: David R. Worsley, Lamar, MO (US); Michael R. Hurt, Lamar, MO (US)

(73) Assignee: Redneck Outdoor Products, LLC, Lamar, MO (US)

(*) Notice: Subject to any disclaimer, the term of this patent is extended or adjusted under 35 U.S.C. 154(b) by 0 days.

(21) Appl. No.: 14/211,939

(22) Filed: Mar. 14, 2014

(65) Prior Publication Data

US 2014/0261197 A1    Sep. 18, 2014

Related U.S. Application Data

(60) Provisional application No. 61/786,154, filed on Mar. 14, 2013.

(51) Int. Cl.
  *A01K 39/00*    (2006.01)
  *A01K 5/02*    (2006.01)

(52) U.S. Cl.
  CPC .................................. *A01K 5/0225* (2013.01)

(58) Field of Classification Search
  CPC .... A01K 39/04; A01K 39/12; A01K 5/0225; A01K 5/0114
  USPC ........ 119/51.01, 57.92, 52.3, 52.1, 57.8, 74; 221/247, 248, 250, 266, 281, 282, 283, 221/285, 306, 305; 222/180, 181.1, 181.2, 222/181.3, 185.1; 220/710
  See application file for complete search history.

(56) References Cited

U.S. PATENT DOCUMENTS

| | | | | |
|---|---|---|---|---|
| 3,181,415 A | * | 5/1965 | Laing | 353/58 |
| D268,056 S | * | 2/1983 | Campbell-Kelly | D30/121 |
| 4,792,122 A | * | 12/1988 | Smrt | E04H 17/1413 256/54 |
| 4,793,533 A | * | 12/1988 | Yang | 224/148.2 |
| 4,807,567 A | * | 2/1989 | Atchley | 119/477 |
| 4,821,678 A | * | 4/1989 | Atchley | A01K 39/02 119/464 |
| 4,940,151 A | * | 7/1990 | Fett | 215/11.1 |
| RE34,725 E | * | 9/1994 | Braden | A01K 9/005 119/51.01 |
| 5,549,074 A | * | 8/1996 | Hui | A01K 1/0356 119/464 |
| 5,947,322 A | * | 9/1999 | Ho | B65F 1/141 220/477 |
| 6,142,100 A | * | 11/2000 | Marchioro | 119/54 |
| 6,305,320 B1 | * | 10/2001 | Fore | A01K 5/00 119/51.01 |
| 6,321,943 B1 | * | 11/2001 | Strickler | A47K 5/1204 222/156 |
| 6,374,773 B1 | * | 4/2002 | McIntyre et al. | 119/72 |
| 6,390,022 B1 | * | 5/2002 | Eichler et al. | 119/72 |
| 7,694,447 B1 | * | 4/2010 | Rutler | G09F 7/002 232/17 |
| 7,891,317 B2 | | 2/2011 | Bodenstab et al. | |
| 8,201,520 B2 | | 6/2012 | Meritt | |
| 8,317,058 B2 | * | 11/2012 | Toth et al. | 220/710 |

(Continued)

*Primary Examiner* — Kristen C Hayes
*Assistant Examiner* — Ebony Evans
(74) *Attorney, Agent, or Firm* — Lathrop & Gage LLP

(57) ABSTRACT

An animal feeder comprises a vertical portion having a front side, a back side, a left side, and a right side. A first groove extends continuously through each of the left side, the front side, and the right side. At least a part of the back side is generally concave to facilitate the securement of the feeder to a tree. An angular portion of the feeder extends from the vertical portion at an angle. The angular portion has a mouth with a stop. The vertical portion and the angular portion collectively define a cavity configured for retaining animal feed. The cavity is accessible at least at the mouth. The back side comprises a channel, a first bracket, and a second bracket, each of which are collectively configured for securement of a T-post.

21 Claims, 6 Drawing Sheets

(56) References Cited

U.S. PATENT DOCUMENTS 8,480,061 B2 * 7/2013 Graves .................... E04H 17/20
                                                      248/220.21
D704,384 S   *  5/2014 Worsley ....................... D30/121
8,893,659 B1 * 11/2014 Hill ................................ 119/72
2015/0181801 A1 * 7/2015 Niemela .............. A01C 17/001
                                                       119/51.01

* cited by examiner

ANIMAL FEEDER

CROSS-REFERENCE TO RELATED APPLICATIONS

This application claims priority to U.S. Provisional Patent Application Ser. No. 61/786,154 filed Mar. 14, 2013, the disclosure of which is incorporated herein by reference in its entirety.

BACKGROUND OF THE INVENTION

1. Field of the Invention

The invention relates generally to the field of animal feeders. More specifically, the invention relates to the field of gravity fed animal feeders.

2. Description of the Related Art

Gravity fed animal feeders are known in the art. For example, U.S. Pat. No. 8,201,520 to Meritt discloses a gravity fed animal feeder having a hopper supported by a frame and a plurality of feed dispensing tubes having angled portions. Each feed dispensing tube is connected to an opening in the hopper. Flow control baffles or valves are provided to limit dispensation of the feed. The hopper may be accessed by a ladder connected to a platform mounted on the hopper.

U.S. Pat. No. 7,891,317 to Bodenstab et al. discloses a gravity fed animal feeder having a hopper supported by a frame. The hopper has a storage reservoir for storing feed, and a feed entry opening. The hopper also includes a feeding chute that is sealingly joined to a feeding chamber. The feeding chamber has a feed supporting surface that allows the feed to move from the reservoir into the chamber by gravity.

SUMMARY

Systems and methods for dispensing feed to animals are disclosed herein. According to one embodiment, an animal feeder comprises a first portion having a first front side and a first back side, a second portion having a second front side and a second back side, a third portion having a third front side and a third back side, and a fourth portion. The first portion, the second portion, and the third portion extend generally vertically, and the fourth portion extends from the third portion at an angle. The first front side has a first groove configured for accommodating a first strap, and the third front side has a second groove configured for accommodating a second strap. The second back side has a first bracket, and the third back side has a second bracket. The first portion, the second portion, the third portion, and the fourth portion collectively define a cavity for retaining animal feed. The second back side is generally concave to facilitate the securement of the feeder to a tree. A channel extends continuously through the third back side and at least a part of the second back side. The first bracket, the second bracket, and the channel are collectively configured for securement of a T-post.

According to another embodiment, an animal feeder comprises a vertical portion having a front side, a back side, a left side, and a right side. A first groove extends continuously through each of the left side, the front side, and the right side. At least a part of the back side is generally concave to facilitate the securement of the feeder to a tree. An angular portion extends from the vertical portion at an angle. The angular portion has a mouth with a stop. The vertical portion and the angular portion collectively define a cavity configured for retaining animal feed. The cavity is accessible at least at the mouth. The back side comprises a channel, a first bracket, and a second bracket, each of which are collectively configured for securement of a T-post.

According to yet another embodiment, an animal feeder comprises a vertical portion having a front side, a back side, a left side, and a right side. A first groove extends continuously through each of the left side, the front side, and the right side. The first groove is configured for accommodating a first strap. At least a part of the back side is generally concave to facilitate the securement of the feeder to a tree. An angular portion extends from the vertical portion at an obtuse angle. The angular portion has a mouth with an adjustable stop. A lid is removably secured to the vertical portion. The vertical portion and the angular portion collectively define a cavity configured for retaining animal feed. The cavity is accessible at least at the mouth. The back side comprises a channel, a first bracket, and a second bracket. The first bracket, the second bracket, and the channel are collectively configured for securement of a T-post. At least one of the first bracket and the second bracket comprise a notch for accepting a clip of the T-post.

According to yet another embodiment, a feeder for animals comprises a food receiving body having a front side and a back side. The back side is adapted to securely receive a post. A top opening is provided for receiving feed into the body. The feeder further comprises a forwardly extending portion near a bottom of the body. The forwardly extending portion defines a mouth for presenting feed to animals.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Embodiments of the present invention provide systems and methods for feeding domestic and wild animals, such as game birds, deer, elk, et cetera. Reference may be made herein to terms such as left, right, front, rear, top, bottom, and the like. These references are exemplary only and are used to describe the invention in a typical orientation, but are not independently limiting.

Figure 1:
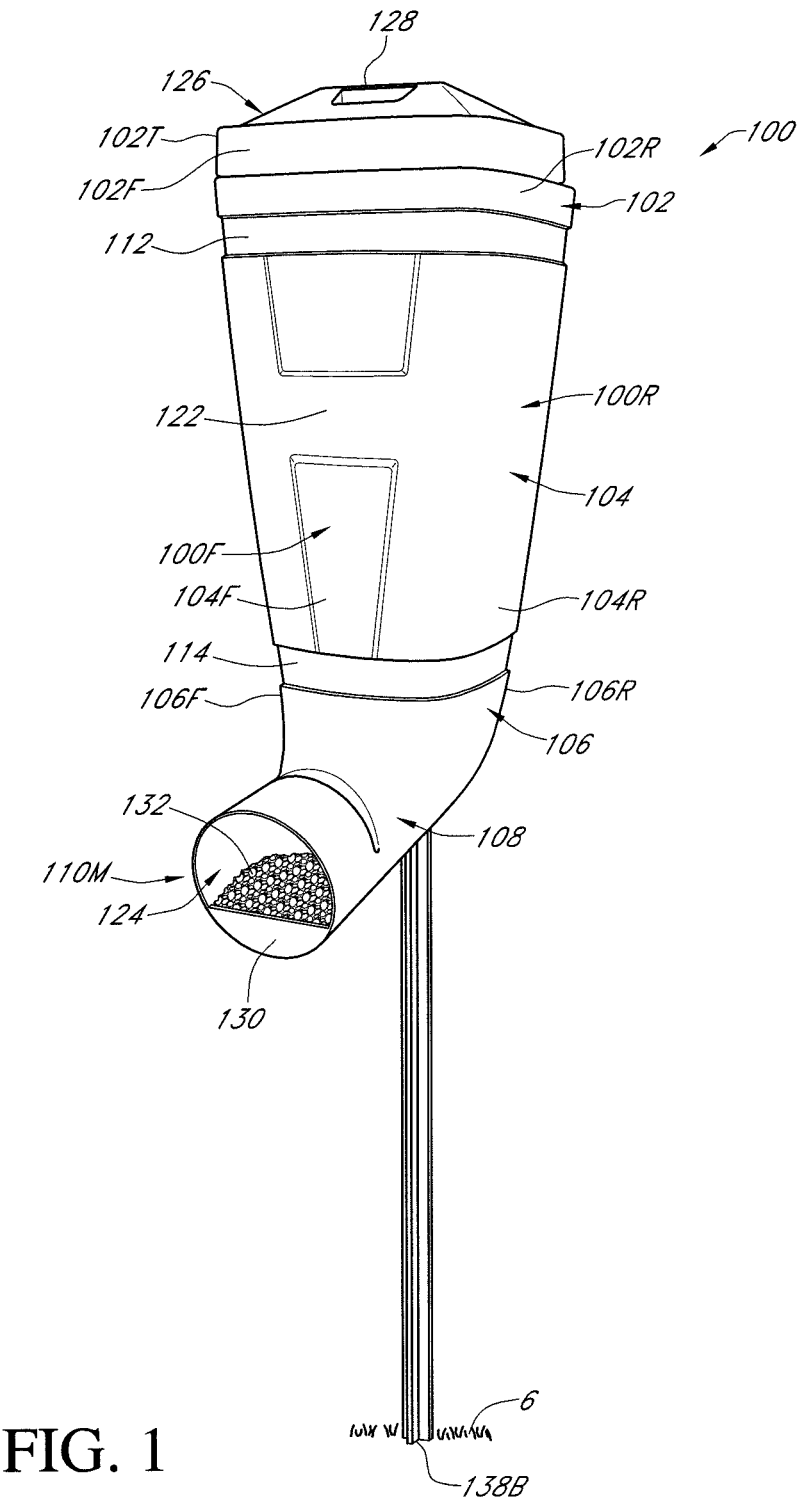
FIG. 1 is a front perspective view of a gravity fed animal feeder, according to an embodiment.

FIG. 1 shows a front perspective view of a gravity fed animal feeder 100, according to an embodiment of the current invention. As can be seen, the feeder 100 may have a front side 100F, a back side 100B (FIG. 3), a left side 100L (FIG. 5), and a right side 100R. The feeder 100 may have a first portion 102, a second portion 104, and a third portion 106. The first portion 102 may have a front side 102F, a back side 102B (FIG. 3), a left side 102L (FIG. 5), and a right side 102R. The second portion 104 may have a front side 104F, a back side 104B (FIG. 3), a left side 104L (FIG. 5), and a right side 104R. Similarly, the third portion 106 may have a front side 106F, a back side 106B (FIG. 3), a left side 106L (FIG. 5), and a right side 106R. Each of the first portion 102, the second portion 104, and the third portion 106 may extend generally vertically (and may collectively be referred to herein as the "vertical portion" or the "food receiving body") More specifically, the second portion 104 may extend generally vertically from the first portion 102, and the third portion 106 may extend generally vertically from the second portion 104. Thus, as can be seen, in the vertical plane, the second portion 104 may be below the first portion 102 and above the third portion 106. A fourth (or "angular" or "forwardly extending") portion 108 may, in the vertical plane, extend at an angle A (FIG. 5) from the third portion 106 and have a mouth 110M. In the preferred embodiment, the angle A may be an obtuse angle (e.g., 100°, 120°, et cetera). However, in other embodiments, the angle A may be a right angle, or even an acute angle. Further, in some embodiments, the fourth portion 108 may extend from the third portion 106 at an angle in the horizontal plane (e.g., the mouth 110M may be oriented to the left or to the right of the front side 100F of the feeder).

Figure 3:
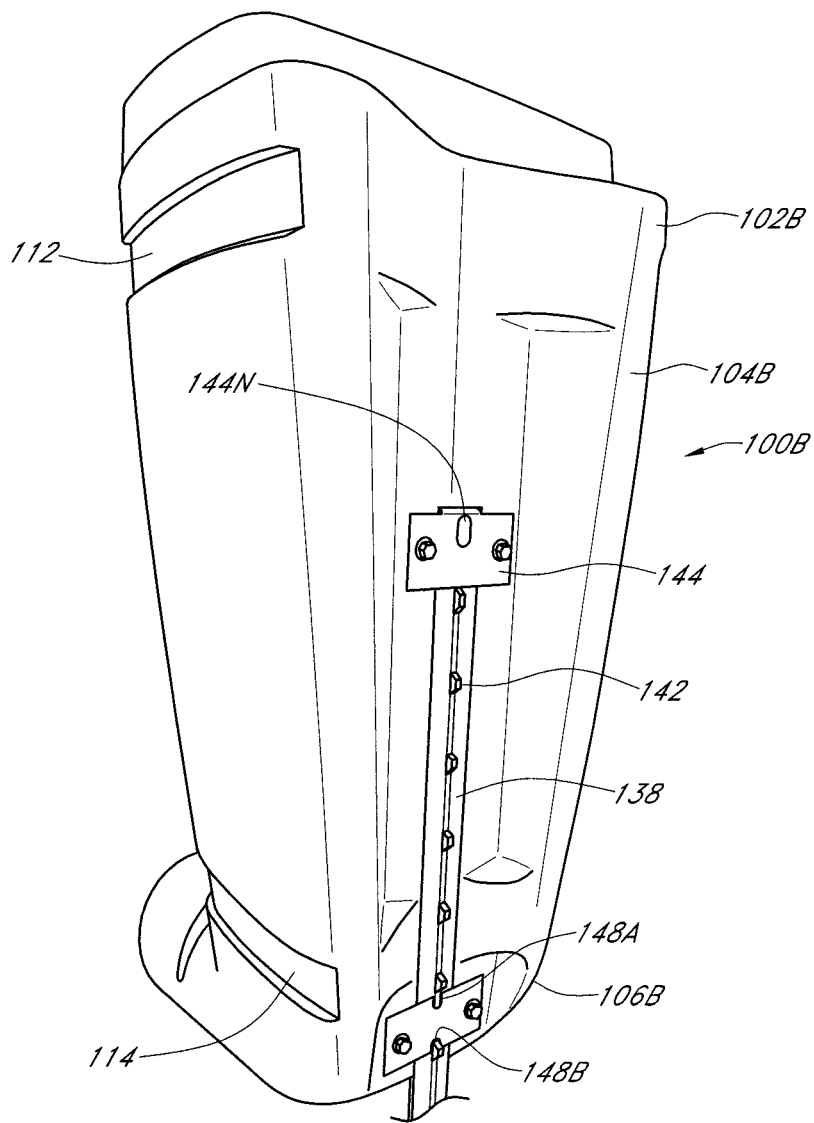
FIG. 3 is another perspective view of the gravity fed animal feeder of FIG. 1.

The first portion 102 may include a first groove or indentation 112 that extends generally continuously at the left side 102L, the front side 102F, and the right side 102R of the first portion 102. The first groove 112 may extend substantially horizontally, and may, at least in some embodiments, not extend at the back side 102B of the first portion 102 (FIG. 3). On the front side 110F, the left side 100L, and the right side 100R of the feeder 100, the first portion 102 and the second portion 104 may be separated by the first groove 112.

The third portion 106 may similarly include a second groove or indentation 114 that extends generally continuously at the left side 106L, the front side 106F, and the right side 106R of the third portion 106. The second groove 114, at least in some embodiments, may not extend at the back side 106B of the third portion 106 (see FIG. 3), and may, in some or all locations, be substantially horizontal. On the front side 110F, the left side 100L, and the right side 100R of the feeder 100, the second portion 104 and the third portion 106 may be separated by the second groove 114.

Figure 5:
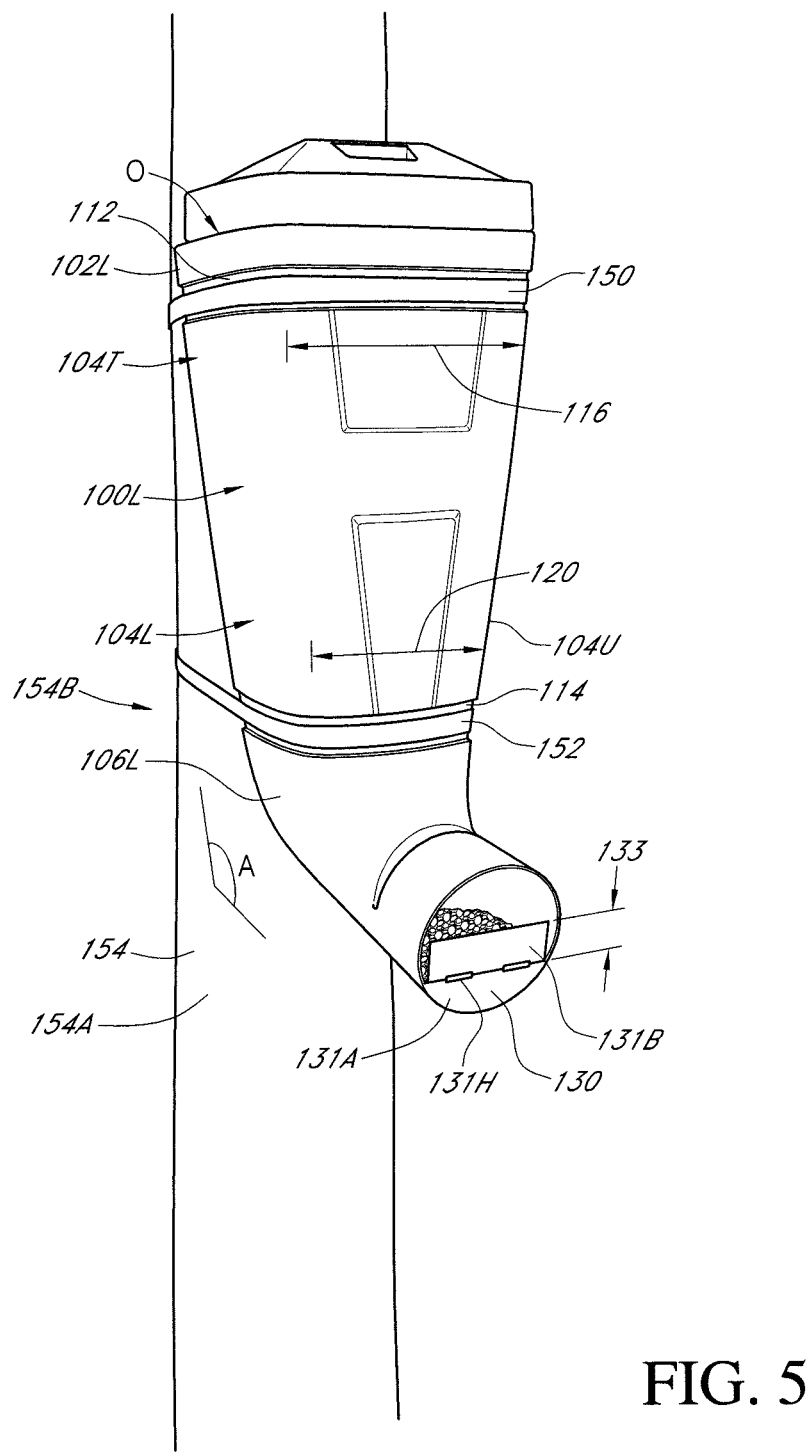
FIG. 5 is yet another perspective view of the gravity fed animal feeder of FIG. 1, shown being secured to a tree via straps.

The second portion 104 may include a slight taper, i.e., a width 116 of a top part 104T of the second portion 104 may be greater than a width 120 of a bottom part 104U of the second portion 104 (see FIG. 5). The front side 104F of the second portion 104 may include a recessed portion 122. The recessed portion 122 may be configured for placement of indicia, or for securement of tags having indicia (e.g., for advertising). In some embodiments, the recessed portion 122 may be rectangular or square shaped, however, such a configuration of the recessed portion 122 is not required. In some embodiments, the recessed portion 122 may comprise two or more indented portions.

The first portion 102, the second portion 104, the third portion 106, and the fourth portion 108 may collectively form a continuous cavity 124. The cavity 124 may be accessible at each of the mouth 110M and the first portion 102 (e.g., the first portion 102 may have a top opening O (not clearly visible) to allow access to the cavity 124). The cavity 124 may be at least partially filled with animal feed (e.g., granular feed, shelled corn, protein supplement pellets, et cetera) via the top opening O in the first portion 102.

The cavity 124 may be closed at a top side 102T of the first portion 102 by a removable lid or cap 126. The lid 126 may be removed to allow the cavity 124 to receive animal feed. While not clearly shown in the figures, the lid 126 may include internal threading that correspond to external threading on the first portion 102 and allow the lid 126 to be screwed thereon. Alternatively, the cap 126 may include protruding elements that correspond to internal notches (not clearly shown) in the first portion 102 and enable the cap 126 to be firmly secured to the first portion 102. The cap 126 may have a handle 128 that allows the feeder 100 to be conveniently transported from one location to another.

The mouth 110M may have a stop 130. The animal feed in the cavity 124 may abut against the stop 130 and be prevented from exiting the mouth 110M unintentionally. The mouth 110M may also include a gap or opening 132 above the stop 130. The animals may access the feed at this opening 132. As the feed abutting against the stop 130 is consumed by an animal, gravity may cause additional feed from the cavity 124 to take its place.

In some embodiments, a height 133 (FIG. 5) of the stop 130 may be adjustable. For example, as shown in FIG. 5, the stop 130 may have a lower portion 131A and an upper portion 131B that is secured to the lower portion 131A by hinges 131H or other suitable means. The upper portion 131B may be folded behind the lower portion 131A of the stop 130 to decrease the height 133 of the stop 130, or may be stood upright atop the lower portion 131A to increase the height of the stop 130. The height 133 of the stop 130 may thus be adjusted to account for different sized animals and feed. For example, the height 133 of the stop 130 may be raised to prevent large animals from accessing feed in the feeder 100 that is meant for birds. In some embodiments, a separate cap (not specifically shown) may be placed on the mouth 110M to prevent access to the cavity 124 via the mouth 110M.

Figure 4:
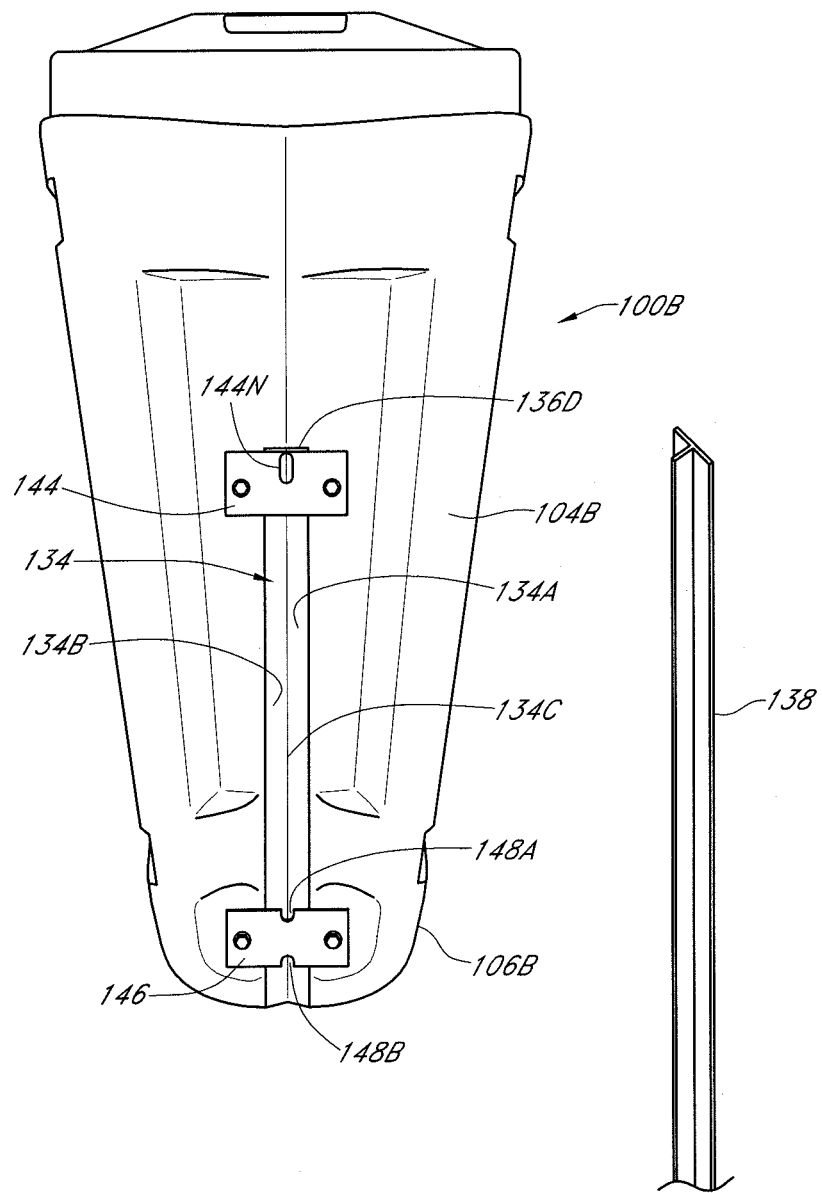
FIG. 4 is another rear perspective view of the gravity fed animal feeder of FIG. 1, showing a V-shaped groove in a back side of the feeder.

Proper securement of animal feeders is of prime importance. Specifically, if animal feeders are not firmly secured, the animals may knock them down while feeding, which may cause the feed to unintentionally exit (e.g., through the mouth 110M) and/or hinder operation of the feeders. Attention is now directed to FIG. 4. The back side 100B of the feeder 100 (and more particularly, the back side 104B of the second portion 104, and in some embodiments also the back side 106B of the third portion 106) may include a channel 134. The channel 134 may be generally V-shaped as shown, and have a first slanting portion 134A and a second slanting portion 134B that are separated by a generally flat middle portion 134C. The channel 134 may terminate at a top portion 136D. The channel 134 may be configured to accept fence T-posts, which have become ubiquitous. For example, the channel 134 may be configured to accept a T-post 138 shown in FIG. 2.

Figure 2:
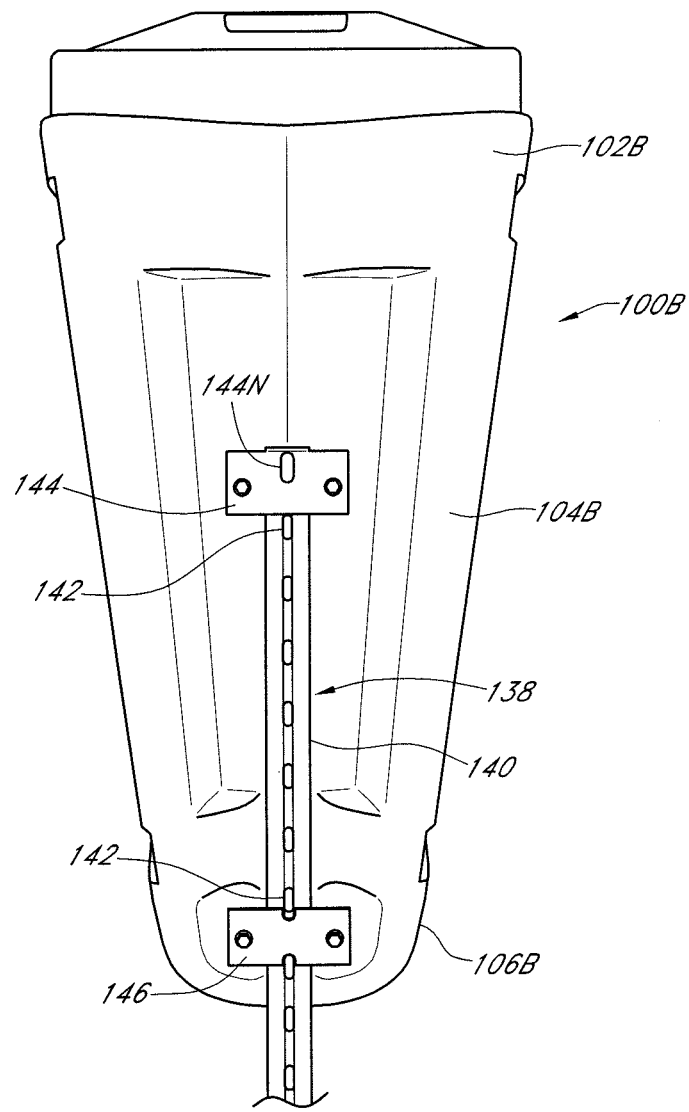
FIG. 2 is a rear perspective view of the gravity fed animal feeder of FIG. 1, shown being secured to a fence T-post.

As is known, the T-post 138 may have a flat front side 140 and a protruding member 138P extending therefrom and forming a T shape. The protruding member 138P may be housed within the channel 134 adjacent the flat middle portion 134C such that the top of the protruding member abuts the top portion 136D of the channel 134 and supports the feeder 100. The T-post 138 may have clips 142 (FIG. 2). A first bracket 144 may be secured (e.g., by fasteners, glue, et cetera) to the back side 104B of the second portion 104 adjacent the top portion 136D of the channel 134, and a second bracket 146 may be secured to the back side 104B of the second portion 104 (or the back side 106B of the third portion 106) such that it is beneath the first bracket 144. As can be appreciated, the first bracket 144 and the second bracket 146 may in the vertical plane be generally aligned. The first bracket 144 may have a hole or gap 144N at its top side. The second bracket 146 may have two notches 148A and 148B (FIG. 4) at its top side and bottom side, respectively. The hole 144N in the first bracket 144 and the notches 148A, 148B in the second bracket 146 may each be configured to mate with the clips 142 of the T-post 138 (see FIGS. 2, 3). Thus, as can be seen in FIG. 2, the channel 134 and the brackets 144, 146 may allow the feeder 100 to be sturdily supported upright by the T-post 138. A lower end 138 of the T-post may then be dug into the ground G or other such surface (FIG. 1).

The feeder 100 may advantageously also be secured to a tree or other posts. Specifically, the back side 104B of the second portion 104 (and, in some embodiments, also the back side 102B of the first portion 102 and/or the back side 106B of the third portion 106) may be curved inward and be generally concave (see FIG. 3). This concave shape of the back side 104B of the second portion 104 may allow the back side 100B of the feeder 100 to wrap around part of the tree or other similarly shaped objects. To secure the feeder 100 to a tree 154 (see FIG. 5), the back side 100B of the feeder 100 may be placed adjacent a first side 154A of the tree 154. A first strap 150 may then be passed within the first groove 112 and secured (e.g., using standard ratchet straps, knots, fasteners, et cetera) adjacent a second side 154b of the tree 154. Similarly, a second strap 152 may be passed within the second groove 114 and secured adjacent the second side 154b of the tree 154. Thus, in part because of the grooves 112, 114, the feeder 100 may be sturdily secured to a tree other objects having a generally convex surface.

Figure 6:
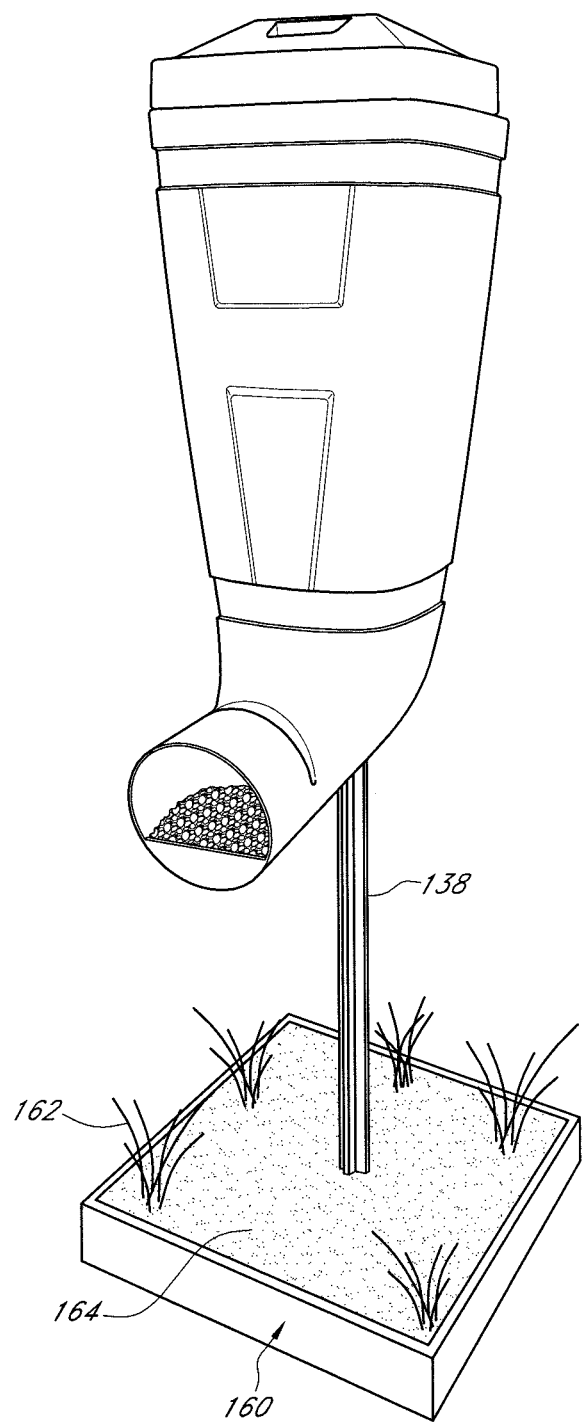
FIG. 6 is still another perspective view of the gravity fed animal feeder of FIG. 1 secured via a fence T-post to a weighted base.

As discussed above, the feeder 100 may be secured via the T-post 138 to the ground G or other surface and/or via the straps 150 to the tree 154. In some situations, both these options for securing the feeder 100 may be unfeasible (for example, where the feeder 100 is to be located on a concrete surface devoid of trees). Attention is directed now to FIG. 6, which shows the T-post 138 being secured to a weighted block 160. The appearance of the weighted block 160 may be configured to emulate a forest, a park, a ranch, et cetera, to entice animals to use the feeder 100. For example, the weighted block 160 may comprise grass 162 and sand 164, which may make the feeder 100 more approachable to the animals. The weight of the weighted block 160 may be configured so as to allow the block 160 to safely support the feeder 100 via the T-post 138. Thus, the feeder 100 may conveniently be transported along with the weighted block 160 and be securely placed for use at any conceivable location. While not required, in some embodiments, the weighted block 160 may be configured to be filled with water after it is placed at the desired location (i.e., the weight of the water may be used to ensure that the weighted block 160 adequately supports the feeder 100). Such a configuration may further increase the ease with which the feeder 100 may be transported.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. While the first portion 102, the second portion 104, the third portion 106, and fourth portions 108 have been described as being distinct, people of skill in the art will appreciate that they may be of unitary construction. Further, the size (and/or shape) of the feeder 100 depicted in the figures is exemplary only, and may be varied for different applications.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An animal feeder, comprising:
    a first portion having a first front side and a first back side; the first front side having a first groove configured for accommodating a first strap;
    a second portion having a second front side and a second back side; the second back side having a first bracket; the second portion extending generally vertically from the first portion;
    a third portion having a third front side and a third back side; the third front side having a second groove configured for accommodating a second strap; the third back side having a second bracket; the third portion extending generally vertically from the second portion; and
    a fourth portion having a mouth with a stop; the fourth portion extending from the third portion at an angle;
    wherein the first portion, the second portion, the third portion, and the fourth portion collectively define a cavity configured for retaining animal feed;
    wherein the second back side is generally concave to facilitate the securement of the feeder to a tree; and
    wherein a channel extends continuously through the third back side and at least a part of the second back side; the first bracket, the second bracket, and the channel being collectively configured for securement of a T-post.

2. The animal feeder of claim 1 further comprising a lid having a handle; the lid being configured to be removably secured to the first portion.

3. The animal feeder of claim 2, wherein the first bracket has a hole configured to accept a clip of the T-post.

4. The animal feeder of claim 2, wherein the second bracket has a first notch and a second notch; at least one of the first notch and the second notch configured to accept a clip of the T-post.

5. The animal feeder of claim 2, wherein the channel has a first slanting portion and a second slanting portion separated by a flat middle portion.

6. The animal feeder of claim 5, wherein a height of the stop is adjustable.

7. The animal feeder of claim 6 further comprising a weighted block.

8. The animal feeder of claim 7, wherein the weighted block comprises at least one of grass and sand.

9. The animal feeder of claim 8, wherein the second front side includes a recessed portion configured for the placement of indicia.

10. The animal feeder of claim 9, wherein the angle is an obtuse angle.

11. The animal feeder of claim 10, wherein the first groove and the second groove each extend generally horizontally.

12. The animal feeder of claim 11, wherein:
    the first portion further comprises a left side and a right side opposing the left side; and the first groove extends continuously through the left side and the right side.

13. The animal feeder of claim 12, wherein the first groove does not extend through the first back side.

14. An animal feeder, comprising:
a vertical portion having a front side, a back side, a left side, and a right side; a first groove extending continuously through each of the left side, the front side, and the right side; the first groove configured for accommodating a first strap; at least a part of the back side being generally concave to facilitate the securement of the feeder to a tree;
an angular portion extending from the vertical portion at an obtuse angle; the angular portion having a mouth with an adjustable stop; and
a lid removably secured to the vertical portion;
wherein the vertical portion and the angular portion collectively define a cavity configured for retaining animal feed; the cavity being accessible at least at the mouth; and
wherein the back side comprises a channel, a first bracket, and a second bracket; the first bracket, the second bracket, and the channel being collectively configured for securement of a T-post; at least one of the first bracket and the second bracket comprising a notch for accepting a clip of the T-post;
wherein the channel has a first slanting portion, a second slanting portion, and a flat portion; the flat portion separating the first slanting portion from the second slanting portion.

15. The animal feeder of claim 14, wherein:
the lid has a handle; and
the front side has a recessed portion configured for the placement of indicia.

16. An animal feeder, comprising:
a rectangular bracket having a first aperture and a second aperture;
a T-post; and
a vertical portion having a front surface, a back surface, and at least one side surface; the vertical portion defining a cavity for retaining solid animal feed; the back surface having a concave section to facilitate securement of the feeder to a tree; the concave section having a V-shaped channel and a bracket supporting portion adjacent thereto; the V-shaped channel extending generally vertically and being configured to accommodate the T-post; the bracket supporting portion having at least a first opening and a second opening that is laterally aligned with the first opening; each of the first and the second openings configured to accept a fastener for securing the rectangular bracket to the back side when the T-post is inserted into the V-shaped channel; the front surface having a strap retaining groove for accommodating a strap, and a mouth for dispensing the solid animal feed; the strap retaining groove extending generally horizontally continuously through the front surface and at least part of the at least one side surface.

17. An animal feeder, comprising:
a bracket having a first aperture and a second aperture;
a T-post; and
a vertical portion having a front surface and back surface; the vertical portion defining a cavity for retaining animal feed; the back surface having a concave section, a channel for accepting the T-post, and a bracket supporting portion adjacent the channel; the bracket supporting portion having at least a first opening and a second opening; the first aperture and the second aperture configured to respectively align with the first opening and the second opening when the bracket is used to secure the T-post within the channel.

18. An animal feeder, comprising:
a T-post; and
a vertical portion having a front surface and back surface; the vertical portion defining a cavity for retaining solid animal feed; the back surface having a concave section, a channel for accepting the T-post, and a bracket supporting portion adjacent the channel; the front surface having an opening defining a mouth for dispensing the solid animal feed, and a strap retaining groove for accepting a strap; and
a lid.

19. An animal feeder for retaining and dispensing solid animal feed, comprising:
a body having a front surface, a back surface, and two side surfaces; the body defining a cavity for retaining the solid animal feed; the body comprising:
a first securing mechanism configured to facilitate securement of the feeder to a tree; the first securing mechanism having a strap retaining groove configured to retain a strap, and a concave section in the back surface; the strap retaining groove extending through at least a portion of each of the front surface and the two side surfaces; at least a part of the back surface being devoid of the strap retaining groove;
a second securing mechanism configured to facilitate indirect securement of the feeder to a ground surface using a T-post insertable into the ground surface; the second securing mechanism having a V-shaped channel extending through at least part of the concave section, and a bracket supporting portion; the V-shaped channel having a first slanting portion and a second slanting portion, the V-shaped channel being configured to receive the T-post for supporting the feeder; the bracket supporting portion having at least a first opening and a second opening laterally aligned with the first opening, each of the first and the second openings configured to receive a fastener to secure a bracket to the back side when the T-post is inserted into the V-shaped channel; the first opening being outwardly adjacent the first slanting portion; the second opening being outwardly adjacent the second slanting portion; and
a mouth for dispensing the solid animal feed; the mouth being below the strap retaining groove.

20. An animal feeder, comprising:
a vertical portion having a cavity for retaining solid animal feed; a front side of the vertical portion having a groove configured to accommodate a strap; a back side of the vertical portion having a concave section, a V-shaped channel configured to accept a T-post, and a bracket supporting portion having at least a first fastener receiving area and a second fastener receiving area that is laterally aligned with the first fastener receiving area; each of the first and the second faster receiving areas configured to accept a fastener for securing a bracket to the back side when the T-post is inserted into the V-shaped channel;
a mouth for dispensing the solid animal feed; and
a lid situated atop the vertical portion;
wherein, each of the first and the second fastener receiving areas are outwardly adjacent the V-shaped channel.

21. An animal feeder, comprising:
a vertical portion having a cavity for retaining solid animal feed; a front side of the vertical portion having a groove configured to accommodate a strap; a back side of the vertical portion having a concave section; the concave section having a channel and a bracket supporting portion; the channel configured to accept a T-post to facilitate securement of the feeder to a ground surface; the bracket supporting portion having at least a first opening and a second opening that is laterally aligned with the first opening; each of the first and the second openings configured to accept a fastener for securing a bracket to the back side when the T-post is inserted into the channel;

a mouth for dispensing the solid animal feed; and a lid situated atop the vertical portion.

\* \* \* \* \*